Sept. 12, 1944. H. G. SANDERS 2,358,254
APPARATUS FOR MOVING ARTICULATIONS
Filed Dec. 15, 1941 6 Sheets-Sheet 1

INVENTOR
Helen G. Sanders
BY John Flam
ATTORNEY

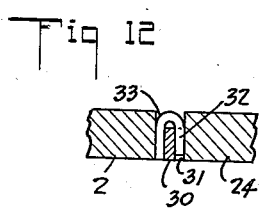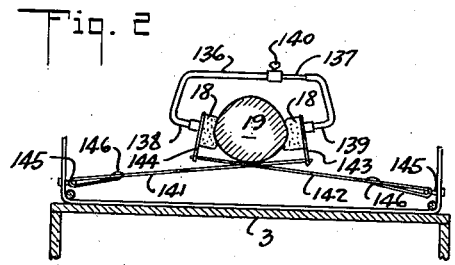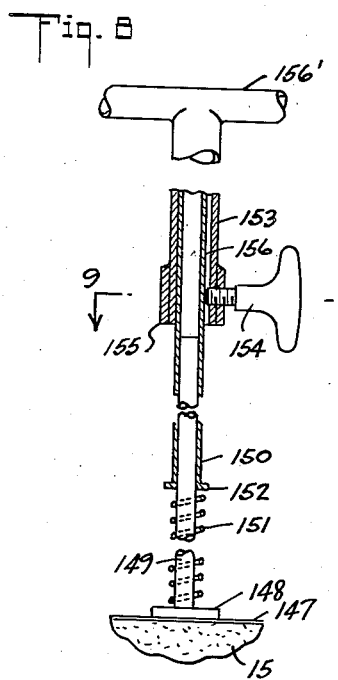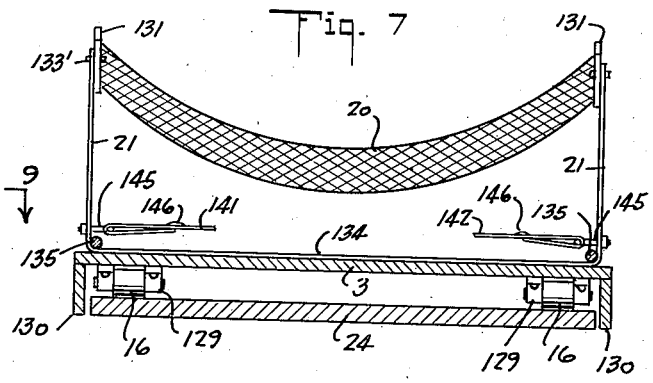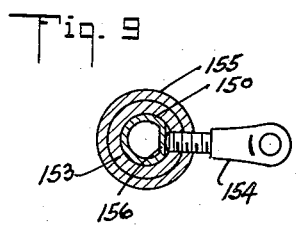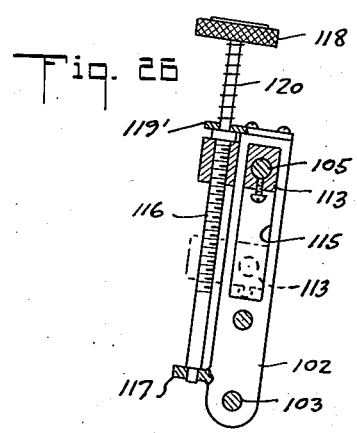

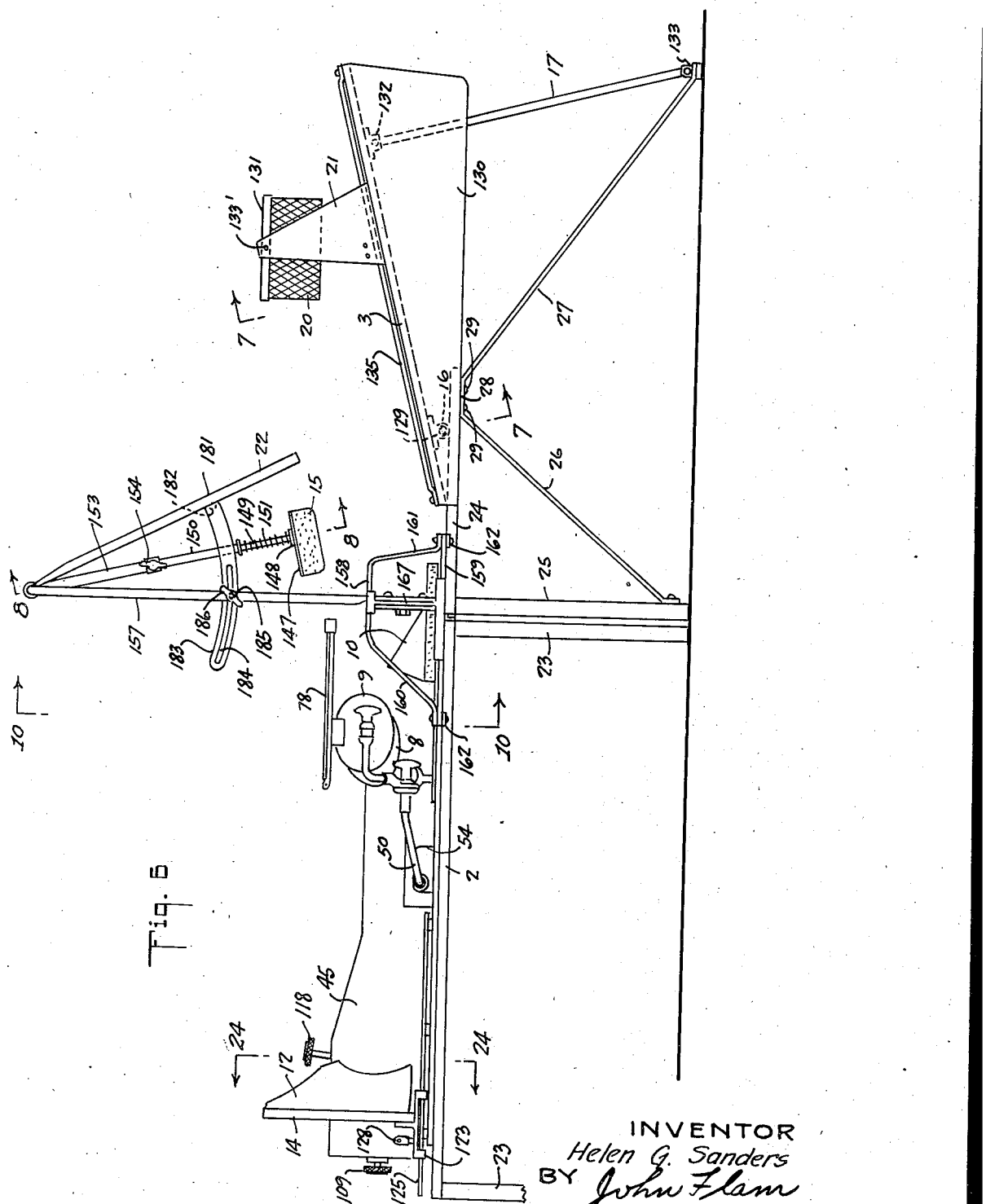

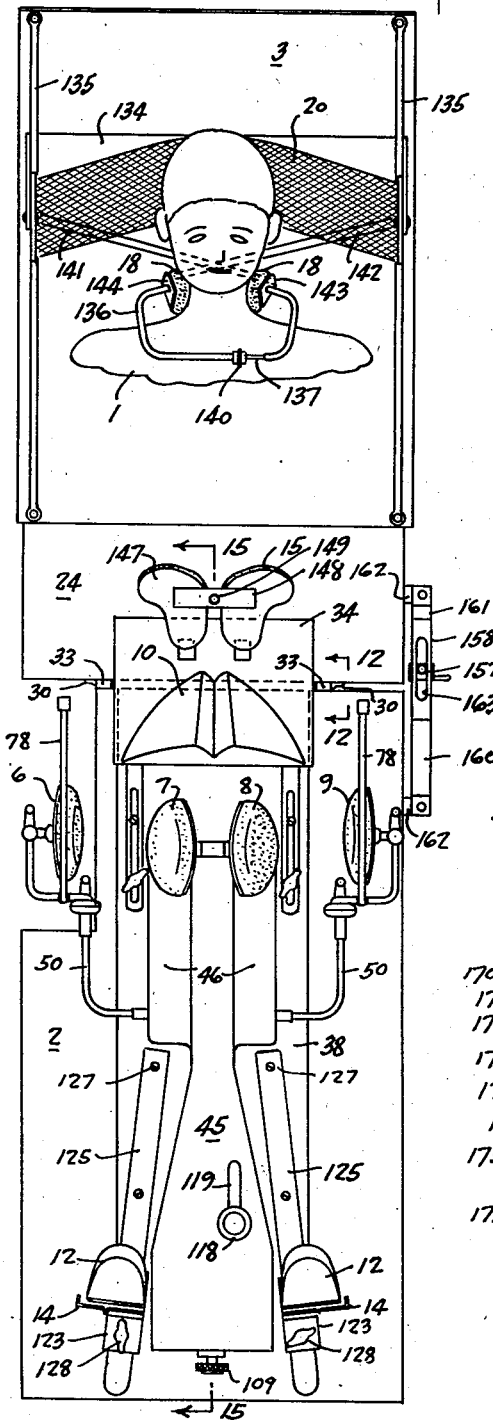

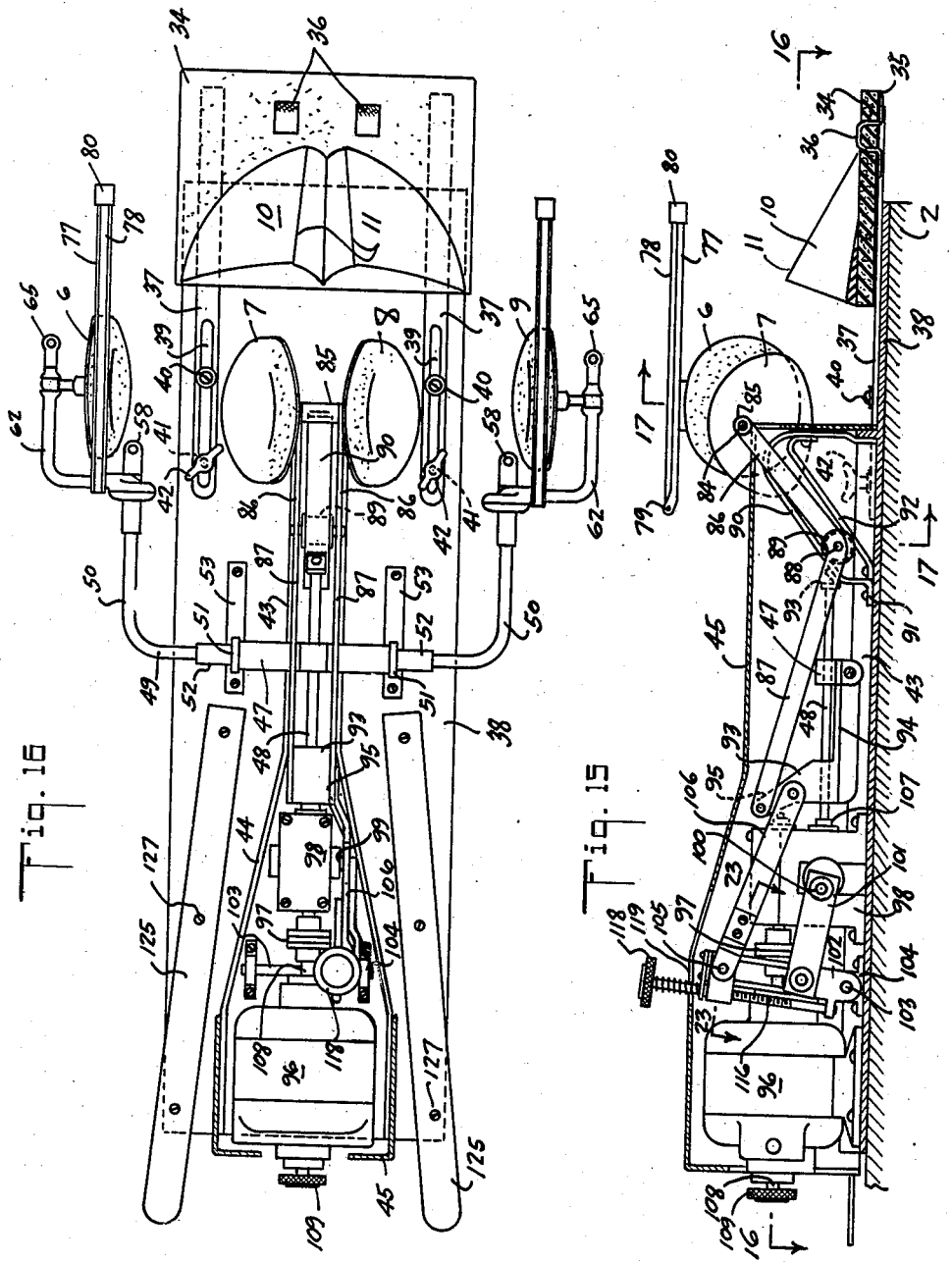

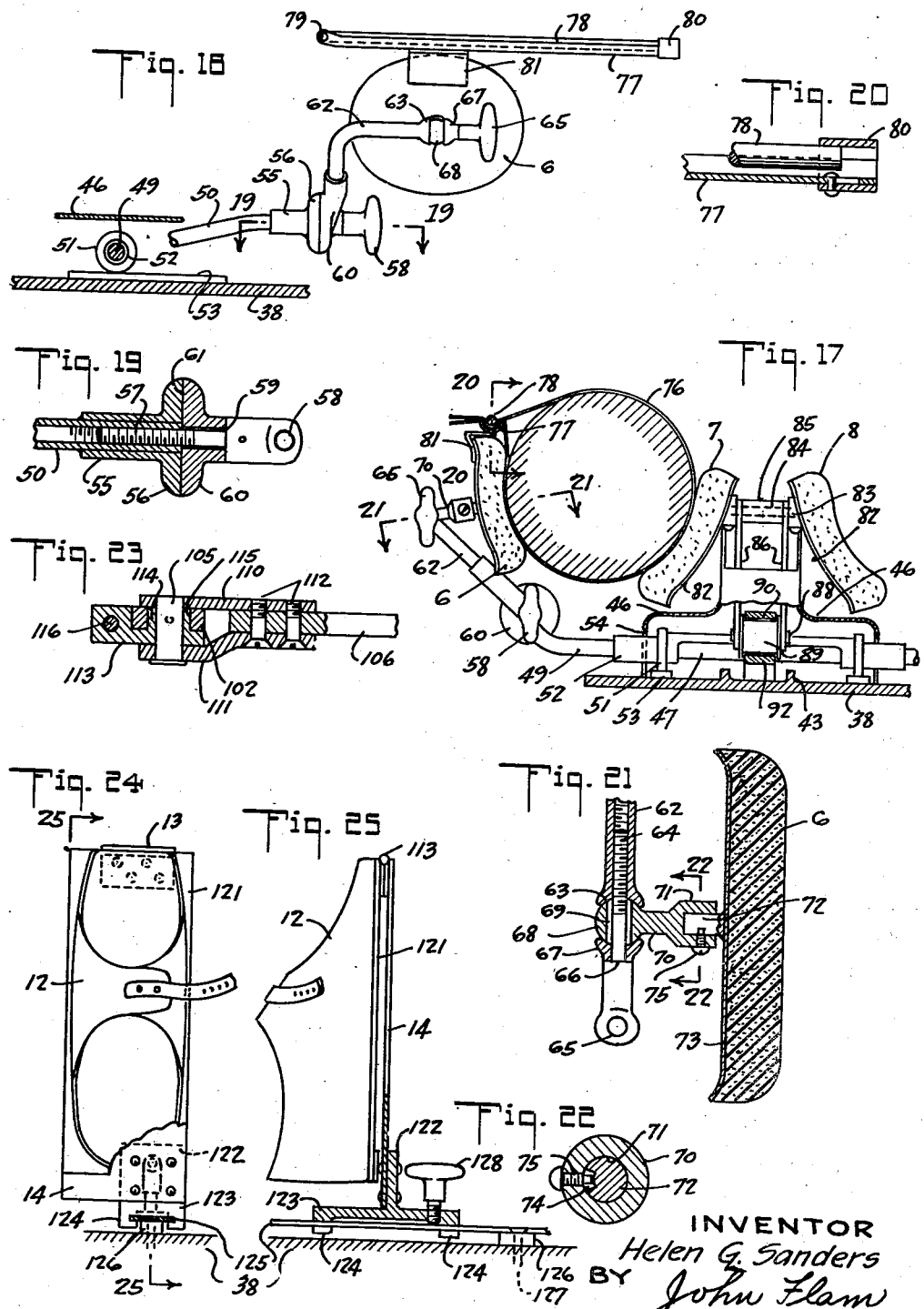

Patented Sept. 12, 1944

2,358,254

UNITED STATES PATENT OFFICE 2,358,254

APPARATUS FOR MOVING ARTICULATIONS

Helen G. Sanders, Los Angeles, Calif.

Application December 15, 1941, Serial No. 422,964

19 Claims. (Cl. 128—25)

This invention relates to a mechanism adapted to act upon articulated parts of the body. More particularly the apparatus is constructed to correct defective posture and its attendant harmful results.

In a normal, healthy individual, the body in an upright position has a perpendicular "gravity line" about which the weight of the body is balanced. This line passes perpendicularly forwardly of the backbone, and the long axis of the pelvis is coincident with it. In such circumstances, the backbone has a graceful curve, departing only by slight undulations from the vertical; the internal organs are properly supported by aid of the skeleton; and these organs are given an opportunity to perform their functions normally and properly.

In many instances however, the posture departs substantially from this desired normal condition. This is usually evidenced by "stoop shoulders," and more pronounced undulations of the spine, even when the individual is erect. The long axis of the pelvis, instead of being vertical, inclines forwardly. The entire body is misshapen; the positions of the internal organs are disturbed, and physical discomfort and organic interference often result.

It is one of the objects of this invention to provide an apparatus adapted to manipulate the human body in such manner as to assist in the restoration of the posture to a normal condition, with its attendant advantages.

This result is accomplished by moving certain articulations of the skeleton, and causing them to be operated in a cyclic manner, the cycle being repeated quite rapidly over a period of time. For example, these articulation movements may occur as often as one hundred times per minute, although the specific period may be chosen to comply with the desired results.

A number of related articulations are operated substantially simultaneously. Among the important ones are the sacro-iliac articulations of the pelvis. These occur between the sacrum bone and the two iliac bones of the pelvis. The sacrum is one of the lower bones of the spinal column. Motion of this articulation, to move the iliac bones in a hip narrowing and hip broadening manner, is effected by forces exerted upon the upper legs. Simultaneously, cyclic forces are exerted upon the abdomen to move the entire pelvis posteriorly and to assist the articulation. At the top of the spinal column, articulation at the neck is provided for, so as to permit that portion of the column to flex properly when the other articulating forces are applied.

It is thus another object of this invention to make it possible to effect these articulations in a proficient manner, and particularly without any discomfort to the subject. This result is accomplished primarily by motion upon the upper leg muscles, transmitted thereto by the aid of pads contacting the upper or thigh portions of the leg.

It is still another object of this invention to secure these benefits by the aid of apparatus that periodically operates such pads to cause the pads to turn the upper leg outwardly and upwardly; this compound motion operates the pelvic bones by the aid of the inner leg muscles, known respectively as the adductor muscles. These muscles are thus caused to exert a periodic pulling force, causing the femurs to rotate outwardly. This outward rotation in turn affects the muscle fibers of the ilio-psoas by relaxing them, thus allowing the corrective posterior movement of the three major bone articulation of the body, namely the lumbo-sacral and two sacro-iliac.

It is still another object of this invention to improve in general, apparatus of this general character.

This application is a continuation in part of an application filed May 13, 1940, in the name of Helen G. Sanders, under Serial No. 334,815, and entitled: "Device for aligning the lower extremities and pelvis."

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 2 is a diagrammatic sectional view taken along plane 2—2 of Fig. 1, and illustrating the manner in which the neck of the subject may be restrained;

Fig. 6 is a side elevation of the apparatus taken from the opposite side to that shown in Fig. 1;

Figs. 7 and 8 are detail sectional views taken along correspondingly numbered planes of Fig. 6;

Fig. 9 is a section taken along plane 9—9 of Fig. 8;

Fig. 10 is a sectional view taken along plane 10—10 of Fig. 6;

Fig. 11 is a plan view of the apparatus, only the head and shoulder portions of the subject being illustrated;

Fig. 12 is a fragmentary section taken along plane 12—12 of Fig. 11;

Fig. 13 is a fragmentary elevation taken from the direction of arrow 13 on Fig. 10;

Fig. 14 is a sectional view taken along plane 14—14 of Fig. 13;

Fig. 15 is a longitudinal sectional view taken along plane 15—15 of Fig. 11;

Fig. 16 is a sectional view taken along plane 16—16 of Fig. 15;

Fig. 17 is a fragmentary cross sectional view taken along plane 17—17 of Fig. 15;

Fig. 18 is a detail elevation illustrating one of the outside pads and its supporting arm;

Fig. 19 is a sectional view taken along plane 19—19 of Fig. 18;

Figs. 20 and 21 are sections taken along correspondingly numbered planes of Fig. 17;

Fig. 22 is a detail section taken along plane 22—22 of Fig. 21;

Fig. 23 is an enlarged detail section taken along plane 23—23 of Fig. 15;

Fig. 24 is a sectional view taken along plane 24—24 of Fig. 6;

Fig. 25 is a sectional view taken along plane 25—25 of Fig. 24; and

Fig. 26 is an enlarged detail of the adjustable lever mechanism illustrated in Figs. 15 and 23.

Figure 1:
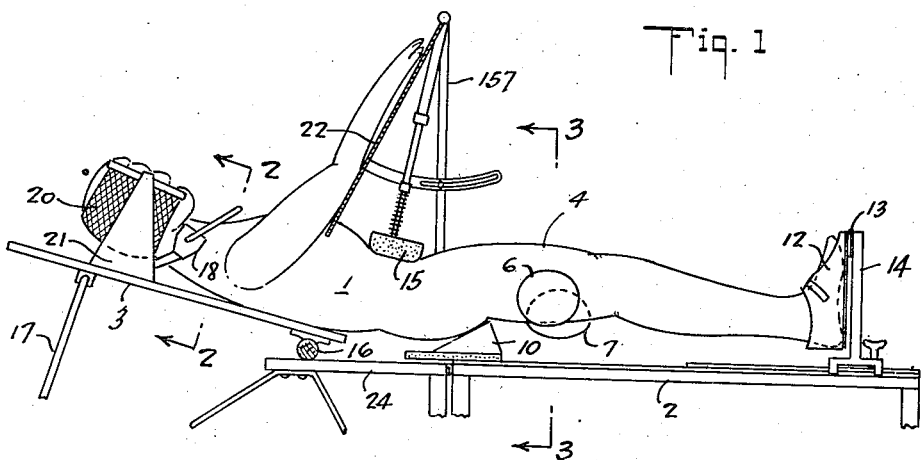
Figure 1 is a diagrammatic side elevation of an apparatus incorporating the invention, shown in use in connection with a subject.
Figure 4:
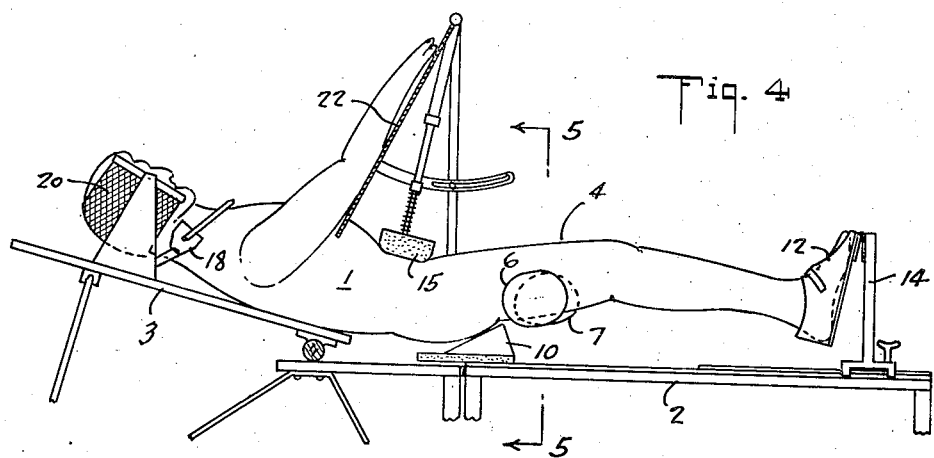
Fig. 4 is a view similar to Fig. 1, illustrating the position of the apparatus and the subject in a different position than that illustrated in Fig. 1.

In the diagrams of Figs. 1 and 4, the subject 1 is shown as in prone position upon the tables or rests 2 and 3. The figure of the subject is shown only in diagrammatic fashion, in order more clearly to illustrate the various manipulative movements accomplished by the aid of the apparatus. In this connection attention is also directed to Figs. 2, 3 and 5.

The position of Fig. 1 may be considered to be a beginning position and that of Fig. 4 as the extreme position at which point the legs of the subject are flexed to the maximum degree in the cycles performed by the machine. This maximum flexing, as will be explained hereinafter, may be adjusted to suit the requirements; for after the subject becomes accustomed to the motion of the machine, the motions of the legs can be increased.

The right and left legs of the subject are illustrated by the reference characters 4 and 5 respectively. They are shown as accommodated between the pairs of pads 6—7 and 8—9. These pads, as will be described hereinafter, are provided with soft yielding faces such as of sponge rubber, so as to provide a comfortable rest for the upper leg portion.

Figure 3:
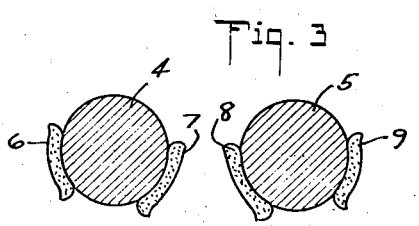
Fig. 3 is a diagrammatic sectional view taken along plane 3—3 of Fig. 1 and illustrating the manner in which the leg pads engage the upper leg of the subject.

In the fully extended position of the subject 1 as illustrated in Figs. 1 and 3, the outer pads 6 and 9 engage the outer sides of the upper portions of the legs 4 and 5 respectively. The inner pads 7 and 8 are slightly angularly displaced downwardly from the pads 6 and 9. In the operation of the apparatus the inner pads 7 and 8 are intended to operate upon the adductor muscles of the upper leg and accordingly these pads 7 and 8 are made movable so as to rise, and thus lift the legs 4 and 5 to the position illustrated in Figs. 4 and 5. The legs in this position are flexed; but in addition they have been rotated outwardly upon the outer pads 6 and 9 by the raising of the pads 7 and 8. Simultaneously with this rotation the outer pads 6 and 9 as well as the inner pads 7 and 8 are moved downwardly lengthwise of the subject 1 toward the feet thereof. Accordingly there is a corresponding exertion of a force upon the vastus externii muscles (which are located at the outer portions of the legs 4 and 5). The combined effect is that the adductor muscles act upon the long leg bone or femur of the leg to rotate the femur outwardly of the body. In turn, this rotation of the femur exerts a force upon the loin muscles, and specifically the ilio-psoas muscles, and particularly where these loin muscles are inserted in the pelvic formation. In turn the forces thus exerted upon these loin muscles operate to move the two anterior superior iliac spines toward each other, thereby causing a relaxing and spreading movement between the two posterior superior iliac spines, opening a space to permit the return of the sacral bone to its proper position between the two iliac bones. This movement thus corrects sacro-iliac mal-positions and through the continuation of this corrective force through the psoas muscle fibers, the lumbar lordosis is corrected with the resulting realinement of the lumbo-sacral articulation and the abdominal organs.

This cycle of rotation of the femur, etc., is caused to occur by cyclic motion of the pads 6—7—8—9, which may occur at a rate of 100 to 120 times per minute. Accordingly there is a corresponding flexing and unflexing of the legs at this rate in connection with the movement of the pads.

In order to form a good support for the lower pelvic regions of the body, use is made of a pad 10 sloping upwardly and toward the lower portion of the body. This pad, shown most clearly in Fig. 10, is made of resilient rubber. It is shown as having a pair of spaced points 11 adapted to form a rest for the nobby projections (the ischial tuberosities) at the lower portions of the ilia. It may be desirable to insert a supplemental pad, such as sponge rubber or the like, over the main pad 10.

Further provisions for guiding the motion of the subject's body are provided by the aid of foot rests 12 which are hinged as at 13 at the upper extremity of the rest upon an upright 14.

The articulation of the pelvic bones, accomplished in the manner heretofore described, is assisted by an abdominal pad structure 15 supported in a manner to be hereinafter described. This pad structure 15 is arranged so that it presses downwardly upon the abdomen. It assists in the articulation movements of the iliac bones and exerts a force upon the internal organs of the body at that region in an upward and rearward direction, as the pads 6—7 and 8—9 are cyclically moved.

The lumbar regions of the body are supported on the sloping rest 3. This sloping rest is mounted so as to be movable, thus accommodating itself to the forces exerted upon the body by the cyclic operation of the pads. For this reason the rest 3 is shown as having rollers 16 mounted thereon which are adapted to roll upon the left hand portion of the rest 2 and to be guided thereon by a pivoted link mechanism 17.

As the pads 6—7, 8—9 are cyclically moved, the rest 3 moves slightly as a result of the forces imposed upon the upper portion of the body. In order to provide an articulatory movement of the head about the upper portion of the spinal column, use is made of a neck clamp comprising a pair of soft rubber pads 18 shown most clearly in Fig. 2. These pads engage on the region of the neck remote from the jugular vein so as not to cause any disturbance in the circulatory system. They are held in place on opposite sides of the neck 19 by structure to be hereinafter described.

The head itself rests in a swinging or hammock-like support 20 supported at the upper extremities of the brackets 21. These brackets are mounted upon and supported by the aid of the rest 3.

Furthermore, in order to place the muscles of the body in such position that the cyclic movements may be most effective, the arms of the subject 1 are supported upon the flat rests 22. These rests are adjusted to form arm supports at a comfortable angle to the body.

The flexing and unflexing of the knees and of the joint of the pelvis with the attendant outward rotation of the femur bones are coincident with the resultant cyclic movements of the body between the positions illustrated in Figs. 1 and 4. The defects in posture exhibited by exaggerated curves of the spine, and the improper position of the major axis of the pelvis when the body is in an upright position, are corrected by continued operation of the apparatus. The spine is straightened; the sacro-iliac articulations are rendered flexible and the body is properly supported along a perpendicular line that passes through the major axis of the pelvis. This major axis is such that the tuberosities at the lower end of the pelvis fall perpendicularly below the thigh joints.

The particular mechanism whereby these cyclic actions are rendered effective may now be described in greater detail. The mechanism is shown in general to best advantage in Figs. 11, 15 and 16, together with auxiliary sections that will be referred to as the description proceeds.

The rest 2 may be in the form of a table having appropriate upright supports 23 (Figs. 1, 4 and 6). Supplementing this rest is a forwardly extending portion 24 provided with the upright supports 25 and the diagonal braces 26, 27. These braces 26 and 27 may be in the form of metal rods and may if desired be integral so as to form a flat upper portion 28. This flat upper portion 28 as shown most clearly in Figs. 1, 4 and 6 may be appropriately fastened as by the fastening means 29 to the extension 24.

In order detachably to join the two portions 2 and 24 of the rest together, the rest 24, as shown most clearly in Figs. 11 and 12, is provided at its adjacent edge with a pair of members 30 defining the sockets 31. Into these sockets are engaged the free depending legs 32 of the U-shaped coupling members 33, that are fastened to the edge of rest 2.

The pelvis supporting pad 10 which as heretofore stated is made of resilient rubber, is shown as integral with a base portion 34 (Figs. 1, 4, 6, 11, 15 and 16). It is held tightly upon a sheet metal plate support 35 by the aid of the straps 36. These straps as shown most clearly in Figs. 15 and 16 are attached to the plate support 35 and are looped through appropriate apertures in the upper portion of the base 34. The plate 35 has forwardly extending arms 37 by the aid of which it may be attached in an adjustable manner to the main frame 38. This main frame 38 may be a light cast metal member placed upon the top of the rest 2, and fastened thereto by appropriate fastening devices.

For facilitating adjustment of pad 10, the extensions or arms 37 are provided with elongated slots 39. These slots are engaged by the guide screws 40. In order to fasten the pad structure in any desired position corresponding to the position of the particular subject 1 accommodated on the machine, clamp screws 41 attached to the frame 38 pass through the slots 39. The extensions 37 may be held in clamped position by the aid of the wing nuts 42 threadedly engaging screws 41. By loosening these wing nuts 42 the position of the pad 10 may be adjusted to the desired point so that the machine may accommodate shorter or taller subjects as required.

The frame 38 as shown most clearly in Figs. 15 and 16 is provided with the integral upright flanges 43 diverging toward the foot end of the apparatus, illustrated by the portions 44. These flanges are adapted to provide a support for the sheet metal cover member 45 extending upwardly between the legs of the subject and shown also in Fig. 17. The lower edge of this cover member 45 contacts the outside edges of the flanges 43 except where there is a widening of the cover illustrated by the projection 46 in Figs. 11 and 17. Within the space defined by the cover is located the mechanism for cyclically moving the pad structures.

The support for both of the outer pads 6 and 9 will now be described. Since each of the outside pads 6 and 9 are similar, the mechanism associated with but one need be described in detail. As shown most clearly in Figs. 15, 16, 17 and 18, there is a cross head 47 provided in the form of a casting which extends transversely of the frame 38. This cross head is mounted for sliding movement on a stationary guide rod 48 supported in a manner to be hereinafter described. This guide rod 48 passes through a corresponding aperture in the cross head 47. The axis of the rod 48 corresponds to the center line of the apparatus and is parallel with the longitudinal axis of the apparatus.

The cross head 47 supports a bar 49 extending transversely below the rod 48. The bar 49 extends considerably beyond the sides of the cross head. Both ends of this bar 49 are turned toward the head of the subject to form the extensions 50. It is on these extensions 50 that the outside pads 6 and 9 may be adjustably supported. In order to provide a supplemental support for the rod 49 and the extensions 50, a pair of rollers 51 (Figs. 16, 17 and 18) are rotatably mounted upon the rod 49 adjacent the corresponding ends of the cross head 47. They may be held in place as by the bushings 52. They engage the pair of parallel metal tracks 53 provided for them on the frame structure 38.

As shown most clearly in Fig. 17, the side extensions 46 of the cover 45 are provided primarily for covering these guide rollers 51 and may be provided with slots 54 (see particularly Fig. 6) through which the bushings 52 project.

The mechanism for moving the cross head 47 will be described hereinafter. For the present, the description will be confined to the particular manner in which the pads 6 and 9 are supported on the extensions 50. In this connection attention is invited to Figs. 6, 11, 15, 16, 17, 18 and 19. At the forward end of each of the extensions 50 there is an enlarged portion 55 terminating in the flange 56. This extremity of the extension 50 is shown as axially apertured and provided with internal threads for the accommodation of a clamping screw 57. This clamping screw has a handle 58 forming a shoulder 59 that serves as a clamping surface to hold a bracket 60 in fixed position with respect to the flange 56. The contacting faces 61 (Fig. 19) of the bracket 60 of the flange 56 may be roughened in order to ensure an effective clamping action. The angular position of bracket 60 can thus be adjusted.

The outer extremity of the bracket serves as a support for the bent rod 62 having a horizontal extension directed toward the head of the subject. As shown most clearly in Fig. 21, the rod 62 is hollow and is provided with a ball joint seat 63 at its extremity. It is internally threaded for the accommodation of a clamping bolt 64 manipulated by a handle 65. The shoulder 66 of the handle 65 abuts against the cooperating ball seat 67. Between these two ball seats 63 and 67 is accommodated a ball joint 68 through which there is a large clearance aperture 69 for bolt 64. In this way by loosening of the handle 65 the ball joint 68 may be adjusted to a limited extent. This adjustment is provided for the purpose of adjusting the position of the arm 70 projecting transversely of the bent rod 62. At its extremity this arm 70 is provided with a tubular socket 71 (Figs. 21 and 22). In this socket is accommodated the shank 72 attached to the sheet metal backing 73 of the pad 6. The pad proper 6 which may be of sponge rubber or the like, is securely cemented to the sheet metal backing 73.

The shank 72 is so arranged that it is free to move with respect to the arm 70, and in proper supporting relation to the limb of the subject. For this purpose it is permitted to have a limited angular motion in the socket 71. Thus the shank 72 has an arcuate slot 74 into which projects the inner end of a set screw 75 threaded through the wall of the socket 71. The arcuate motion of the shank 72 is limited by the inner end of the screw 75, which serves as a stop against either wall of the slot 74. In this way the pad 6 is made self-alining.

The description of the structure supporting the pad 6 applies as well to the manner in which the pad 9 is supported. The adjustments provided make it possible to conform the apparatus to the body of the subject.

The reciprocation of cross head 47 (Figs. 16 and 17) provides a to-and-fro motion of the pads 6 and 9. In order to ensure that the upper leg of the subject is held in proper alinement with these exterior pads 6 and 9, use may be made of a thin band 76 (Fig. 17) of flexible material such as sheet rubber which encompasses the upper leg and which is clamped to the corresponding pad 6 or 9. This clamp is shown to best advantage in Figs. 17, 18 and 20, and includes an arcuate clamp half 77 cooperating with a clamp rod 78. This clamp rod 78 is hinged to the left hand extremity of the arcuate or trough-like half 77 as indicated by the hinge pad 79 of Fig. 18. The two ends of the band 76 may be laid into the trough 77 and the clamp rod 78 may then be rotated inwardly to the position illustrated. The rod 78 will be held in clamped position by the aid of a thimble 80 slidable upon the end of the trough 77. This trough 77 may be permanently joined to the upper edge of the pad structure as by the aid of the bracket 81.

Thus in preparing the subject for using the machine, the flexible band 76 is first laid over the pad 6 or 9 (as the case may be) and then the band 76 is folded around the leg and the ends then clamped into the clamp structure 77—78.

Figure 5:
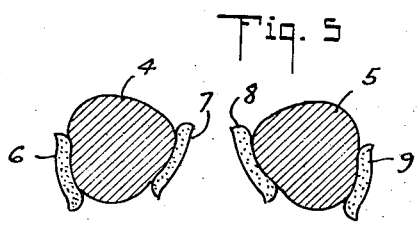
Fig. 5 is a diagrammatic sectional view taken along plane 5—5 of Fig. 4.

The reciprocation of the cross head 47 and raising of the inner pads 7 and 8 to the position illustrated in Fig. 5 causes in effect a rolling motion of the legs outwardly for rotating the femur. This rolling motion is accomplished upon the inner surfaces of the pads 6 and 9.

The manner in which the inner pads 7 and 8 are raised and moved toward the head of the subject at the same time that the pads 6 and 9 are moved will now be described. As shown most clearly in Fig. 17, both of these pads 7 and 8 are of the same general structure as the pads 6 and 9, including a sheet metal backing plate 82. This curved backing plate or supporting member 82 is appropriately fashioned to comply with the form of the pad. These backing plates 82 are each provided with inwardly extending sockets 83 having limited angular motion with respect to the stub shaft 84. This socket and stub shaft structure is identical with that illustrated in connection with the angularly movable support for the pads 6 and 8. As clearly shown in Fig. 17, the axis of the shaft 84 is adjacent the upper edge of the pads 7 and 8. Accordingly gravity tends to retain the pads 7 and 8 in the downwardly turned position of Fig. 17.

The stub shaft 84 is long enough to form appropriate supports at opposite ends of both of the pad sockets 83. This shaft passes through both arms 86 extending generally longitudinally of the apparatus. These arms 86 are held in spaced apart relation as by the aid of the intermediate sleeve 85 (Fig. 17) disposed between the arms 86. These arms 86 extend downwardly and toward the feet of the subject through an appropriate slot formed in the cover 45. These arms 86 are furthermore formed integrally as portions of the links 87. At the angle formed between the arm 86 and link 87, a transverse shaft 88 extends (Figs. 15, 16 and 17). This shaft 88 accommodates a flanged roller 89.

A guide is formed for the flanged roller 89 so that as the link 87 moves toward the right as viewed in Fig. 15, the arm 86 is caused to move toward the right and upwardly. For this purpose an inclined track-way or cam is provided upon which the roller 89 rides.

The upper portion of this track-way engaging between the flanges of the roller 89 is formed by the strap 90. The right hand portion of this strap 90 extends downwardly and is attached to the flange 43 formed on the frame 38. Its left hand portion is formed with a foot 91 similarly attached to the frame 38. The lower portion of the guide for the roller 89 is formed by the bar 92 parallel with the guide-forming portion of the bar 90 and engaged between the flanges of the roller 89. The ends of this inclined guide 92 are appropriately fastened respectively to the downwardly extending portion of the bar 90 and to the frame 38. Furthermore, the upper guide 90 may be formed with a vertical lip 93 in which the right-hand end of the cross head guide 48 may be attached, as shown most clearly in Figs. 15 and 16.

Movement of the link 87 toward the right is caused to occur simultaneously with the movement of the cross head 47 to the right. As this movement progresses, the roller 89 rides upwardly upon the guide 92. Similarly, a retraction of the cross head 47 toward the left as viewed in Fig. 15 will permit the roller 89 to move downwardly upon the track guide 92.

In order to accomplish this motion of the cross head 47 as well as corresponding motion of the link 87, use is made of an oscillating link or pitman mechanism. Thus the guide rod 48 serves to guide a cross head 93 which is integrally joined to the cross head 47 as by the webbing 94 disposed beneath the guide rod 48. This cross head 93 is provided with integral ears 95 projecting generally upwardly from the cross head 93. The left hand ends of the links 87 are pivoted in these ears. Accordingly as the cross head structure 47—93—94 moves on its guide 48 the link 87 is moved both laterally and angularly with respect to the stationary parts of the apparatus.

Reciprocation of the cross head structure is effected by the aid of power derived from a source of motion such as a small electric motor 96 (Figs. 15 and 16). This electric motor 96 is shown as directly mounted upon the left hand portion of the frame 38 and enclosed by the cover 45. The shaft 108 of the motor is shown as coupled by the coupling 97 to a reduction gearing mechanism enclosed in casing 98. This casing 98 is also secured to the frame 38. The output shaft 99 of the transmission in casing 98 extends laterally of the structure. The shaft carries an eccentric crank pin 100 connected to a link 101. This link 101 is pivotally connected to an intermediate point on a rocking lever 102. This rocking lever may be pivoted at its lower end by the aid of a shaft or pin 103 journalled in appropriate standards 104. These standards 104 are secured to the upper surface of the frame 38. The upper end of the rocking arm 102 carries a cross pin 105 to which is pivoted the link 106. This link 106 (shown in greater detail in Fig. 23) serves to transmit the rocking movement of the arm 102 to a reciprocating movement of the cross head structure 47—93—94. For this purpose the right hand end of the link 106 is pivoted to the cross head member 93.

The link structure 106 as shown most clearly in Fig. 23 includes a pair of ears 110 and 111 through which the pin 105 passes. These ears 110 and 111 may be fastened as by the screws 112 to the left hand extremity of the main portion of link 106.

As the crank pin 100 is given a planetary motion by the aid of the transmission shaft 99, the link 101 serves to rock the arm 102. In turn, the rocking of this arm serves to transmit a thrust or a pull upon the link 106 which correspondingly actuates the cross head structure.

The left hand end of the guide rod 48 for this cross head structure (as shown most clearly in Fig. 15) is supported in an appropriate support 107 fastened to the adjacent surface of the transmission casing 98.

During the process of placing the subject upon the machine, it is necessary to adjust the position of the pads 6—7 and 8—9 manually. For facilitating this adjustment, the motor shaft 108 may be extended toward the foot of the mechanism and may carry a hand wheel 109. By appropriate manipulation of this hand wheel the angular position of the crank pin 100 and therefore the pad position of the reciprocating mechanism may be adjusted.

Provisions are made for adjusting the length of the cross head stroke within limits so as to cause a greater longitudinal movement of the pads 6 and 9 as well as longitudinal and vertical movements of the pads 7 and 8. For this purpose the arm 102 is made extensible so as to adjust the distance between the axis of shaft 103 and pin 105. Thus the arm 102 is provided with a deep upper slot into which fits a nut structure 113 (Figs. 23 and 26). This nut structure 13 has a boss 114 through which the pin 105 extends. This boss is guided in the slot formed in the arm 102 (Figs. 23, 26 and 27).

By moving this nut structure 113 with relation to the slot 115 formed in the arm 102, the position of the axis of pin 105 may be adjusted. As this axis is moved away from the axis of shaft 103 the reciprocating movements are increased; and conversely if the axis of pin 105 is moved downwardly toward the axis of shaft 103 the reciprocating movement of the cross head structure is reduced. Accordingly provisions are made for adjusting the position of the nut structure 113 in relation to the slot 115. For this purpose use is made of a screw 116 which is threaded through the nut structure. The lower end of this screw 116 is pivotally supported in a small bracket 117 formed integrally with the arm 102. The upper end of the screw 116 terminates in a knurled hand wheel 118. The cover 45 is slotted as illustrated most clearly at 119 in Fig. 11 to permit the passage of the screw 116 upwardly out of the cover. A plate member 119' is attached to the upper surface of the nut structure 113 and serves as a supplemental guide for the screw 116. A compression spring 120 is disposed between this plate 119 and the hand wheel 118 in order to eliminate any material back lash between the threads of the screw 116 and the nut 113.

The adjustment of the effective length of the rocking arm 102 is necessary to agree with the particular subject that is utilizing the apparatus. A shorter stroke is obviously needed for children as compared with that required for adults and the adjustment may also be necessary to provide the exact stroke found desirable for a particular subject. The ratio of the transmission from the motor shaft to the transmission shaft 99 is such as to provide a cycle of reciprocation about 110 times per minute; but this is subject to the particular requirements.

In order that the combined flexing and rotary movements of the upper leg of the subject be rendered as effective as possible, some restraint must be placed upon the feet of the subject. As explained in connection with Figs. 1 and 4, the foot support or restraint may be in the form of a foot rest in the form of a slipper or sandal having a hinge 13 at the upper extremity on an upright support 14. The details of these foot restraints are illustrated to best advantage in Figs. 6, 24 and 25.

In general, the slipper or sandal device 12 may be arranged for example with an adjustable strap and buckle. The sole of the foot rest 12 is shown as fastened to the metal plate 121 capable of being swung about the hinge 13. This hinge 13 is supported adjacent the standard 14. The standard 14 is in the form of an upright metal member attached to the flange 122 of a bracket 123. This bracket 123 as shown most clearly in Fig. 24.

has depending arms 124 at each end adapted to engage the edges of a guide strip 125. There is a right and a left hand guide strip 125, as shown most clearly in Fig. 11. The brackets 123 may be moved along the guide strips 125 to adjust the foot rest to the length of the body. These guide strips are converged in the manner to cause the feet of the subject to be held at a comfortable spacing. In order to maintain the guide strips 125 in spaced position with respect to the upper surface of frame 38, use is made of a plurality of spacers 126 through which the attaching screws 127 may pass. A clamping screw 128 for maintaining the adjustment of bracket 123 is also provided. This clamping screw is threaded through the bracket 123 and engages the top surface of the guide member 125. This screw may be conveniently provided with an enlarged head for manual manipulation.

The upper part of the body as heretofore stated is intended to be supported upon the rest or sloping table 3. This table 3 may be overlaid with appropriate cushioning rubber sheets if desired. Adjacent the lower edge of the table as heretofore described, brackets 129 are provided for pivotally supporting a pair of spaced rollers 16 (Figs. 1, 5 and 6). At each side of the rest 3 are provided the downwardly depending flanges 130 extending close to the edges of the main support or rest 2.

In order to maintain the rest 3 in the sloping position, use is made of a metal frame 17 (Figs. 6 and 7). This framework 17 is pivotally supported by the bracket 132 to the lower surface of the rest 3. It is likewise pivotally joined to the brackets 133 fastened to the floor.

If the subject's body moves upwardly, the roller 16 moves toward the right as viewed in Fig. 6, and the supporting frame 17 rocks in a clockwise direction. A reverse action occurs when the upper part of the body of the subject moves downwardly. Although during this movement there is a slight variation of the slope of the table or support 3, this is inconsequential. Furthermore, by reason of the fact that the pelvis support 10 is longitudinally adjustable with relation to the apparatus and the foot supports or rests 12 are similarly adjustable, it is not necessary to provide any further adjustment of the rest 3 in order to adjust the apparatus to the size of the subject.

The support 3 carries a sling or hammock-like support 20 for the head of the subject. This may be made from an appropriate fabric or the like connected between the end bars 131. These end bars are pivotally mounted by the aid of the pivot 133' to the top of the standards 21. These arms as shown most clearly in Fig. 7 are integrally joined together by the bottom plate 134. The entire structure including the sling or support 20 and the standard structure 21—134 can be moved along the top of the table or support 3. For this purpose use is made of a pair of parallel round rods 135 (Figs. 6, 7 and 11) placed inside the angle formed between the uprights 21 and the connecting plates 134. It is unnecessary to provide any tight fastening means for the standard 21—134 as there is no material force tending to disturb its position once the head of the subject is placed therein. The swinging support serves effectively to permit the head of the subject to move slightly about a neck vertebra as the apparatus is in motion.

As shown most clearly in Fig. 2, the neck 19 of the subject is confined between the two soft rubber pads 18. These pads 18 are joined by a U-shaped frame including the hollow tube 136 into which telescopes the rod 137. The tube 136 and rod 137 have inwardly directed ends 138 and 139 upon which the pads 18 are respectively mounted. The pads 18 can be brought together or apart and maintained in clamping position by the aid of the set screw 140 passing through the tube 136 and engaging the rod 137.

The neck clamp is furthermore maintained in position by the aid of a pair of straps 141 and 142. The ends of these straps are respectively joined to the metal back-plates 143 and 144 respectively for the neck pads 18, and they cross over to loop through the eye bolts 145, illustrated in Fig. 7. These eye bolts are held in place upon the uprights 21. Both of these straps 141 and 142 may be adjusted by conventional buckles 146 so as to maintain the neck restraint in proper position.

Reference has heretofore been made to the abdominal pad 15. The support for this pad 15 is shown to best advantage in Figs. 6, 8, 9, 10 and 11. This pad 15 is made in the form of a pair of lobes of general kidney shape as shown most clearly in Figs. 10 and 11. Each of the lobes are provided with a metal backing plate 147 joined together as by a cross strip 148. This cross strip in turn is joined to a hollow or tubular support 149 (Figs. 8 and 9) which telescopes into a hollow rod 150. The support 149, however, is axially movable within the guide 150 but it is urged downwardly as by the aid of the compression spring 151 extending between the strap 148 and the flange 152 formed on the lower end of the guide 150.

In turn this guide 150 is held in an adjusted axial position in a hollow supporting member 153. In order to maintain the guide 150 in definite adjusted position with respect to the supporting member 153, use is made of a hand screw 154. This hand screw is threaded through the outer flange 155 of the guide 153 as well as through the guide 153 to engage a flattened portion 156 of the guide 150. The rod 149 is correspondingly flattened, thereby ensuring against angular movement of the pads 15 about the axis of the supporting guide 150.

The support 153 is shown as being rigidly attached to the horizontal portion 156' of a standard having the upright 157 (see also Figs. 13 and 14). The standard and upright may be in the form of pipes mounted in the manner to be hereinafter described.

The particular angular relationship of the axis of the support 153 to the apparatus is best illustrated in Figs. 1 and 4. As the body of the subject 1 is operated upon by the apparatus, the compression spring 149 creates a force upon the pad structure 15. This force urges the abdomen in the proper direction to obtain the desired effect upon the muscles and organs of the abdomen.

The upright 157 is adjustable longitudinally of the support 2. To serve as a support for this upright 157, use is made of a frame having an upper horizontal guide portion 158 and a lower horizontal guide portion 159. The portion 158 is joined to the portion 159 by the depending legs 160 and 161. The supporting structure 158 and 159 may be attached as by the aid of the brackets 162 (Fig. 11) to the edge of the support 2. The lower end 164 (Fig. 13) of the upright 157 passes through a slot 163 in the member 158. It is attached by the aid of screws 166 to a standard 167. This standard 167 is slidable between the upper and lower supporting members 158 and 159. In order to maintain this standard 167 in proper alinement with these members 158 and 159, the standard 167 carries guiding flanges 170 at the top thereof and guiding flanges 171 at the bottom thereof. These flanges engage the edges of the members 158 and 159.

In order to adjust the position of the upright 157 in relation to its guides, the standard 167 is moved along the guiding supports 158 and 159. It may, however, be clamped in any of its adjusted positions as by the aid of the clamping members 172 and 173. These clamping members are arranged respectively to be urged against the lower surface of the support 158 and the upper surface of the support 159. They are therefore arranged to be movable longitudinally of the standard 167. This may be accomplished by providing slots 174, 175 respectively in the clamping members 172 and 173. They are guided for vertical movement by the screws or bolts 176 passing through these slots and threaded into the standard 167. They may be provided if desired with friction plates 177.

In order to adjust these clamping members 172 and 173 into clamping position, use is made of a cam 179 mounted upon a pivot screw 180 fastened to the standard 167. The cam 179 may be provided with an operating handle 178. As clearly seen in Fig. 14, a clockwise rotation of handle 178 will release the clamping members 172 and 173. Thereupon the standard 167 can be moved longitudinally of the guiding supports 158 and 159 and correspondingly the upright 157 may be adjusted. After the adjusted position is reached the handle 178 may be turned in a counterclockwise direction for returning the clamping members 172 and 173 to clamping position.

As illustrated in Figs. 1 and 6, arm rests 22 are also provided. These arm rests as shown most clearly in Figs. 6 and 10, are in the form of flanged flat plates 181, appropriately hinged at their upper ends upon the horizontal support 156. They may be angularly adjusted as a unit about the support 156 and maintained in that adjustment. For this purpose a strap 182 is attached to the lower surfaces of the arm rests 181. Joined to one end of this strap is an arcuate member 183 provided with an arcuate slot 184. This member 183 passes close to the inner surface of the standard 157. A screw 185 passes through the slot 184 as well as through the standard 157. A hand nut 186 engaging the threads of the screw 185 serves to clamp the arcuate member 183 in any desired position within the limits of the slot 184.

The operation of the mechanism has been set forth in detail heretofore. The subject 1 is placed in position, the various pads and rests being adjusted to conform as nearly as possible to the body members of the subject, the motor 96 can then be energized, the length of the stroke of the pads 6, 7, 8 and 9 being adjusted by the aid of the hand wheel 118. Usually the operation of the apparatus is of the order of thirty minutes. The cyclic outward rotation of the femurs and the corresponding articulatory movements of the pelvic bones effect in combination with the action of the abdominal pad, a correction upon the alinement of the pelvis, as well as of the backbone. Upon continued use of the apparatus at regular intervals, not only is the posture improved but the internal organs are caused to assume their natural and normal position.

What is claimed is:

1. In apparatus of the character described, a pad adapted to engage the inner side of the upper leg of a subject, and means for cyclically moving the pad simultaneously to turn the leg outwardly and to flex the leg about its hip joint.

2. In apparatus of the character described, a pad adapted to engage the inner side of the upper leg of a subject, a pad adapted to engage the outer side of the leg opposite said first pad, and a cyclic mechanism for simultaneously moving both pads in a direction lengthwise of the body of the subject, as well as moving the inner pad to cause outward rotation of the leg.

3. In apparatus of the character described, a pad adapted to engage the inner side of the upper leg of a subject, a pad adapted to engage the outer side of the leg opposite said first pad, and a cyclic mechanism for simultaneously moving both pads in a direction lengthwise of the body of the subject, as well as moving the inner pad in a direction transverse to the lengthwise movement.

4. In apparatus of the character described, a pad mechanism forming a rest for the upper part of a leg of a subject, a part of said mechanism being adapted to exert a force on the adductor leg muscle, and means for cyclically moving that part of the mechanism that forms a rest for the leg in such manner as to exert a force on said muscle for rotating the femur.

5. In apparatus of the character described, a support upon which a subject may recline, a pair of pads adapted to engage respectively the inner and outer sides of a leg of the subject, angularly movable means on the support for forming a rest for the foot of the subject, and means for cyclically moving both pads, in such manner that the inner pad exerts a rotary force upon the leg by lifting motion thereof while the movement of the other pad is substantially entirely lengthwise of the body.

6. In apparatus of the character described, a rest for the lower portion of the body, a pair of pads for each of the upper legs, respectively arranged on the inner and the outer sides, and means for cyclically moving both pads simultaneously, the paths of motion of both pads being lengthwise, and only the inner pad having a supplemental motion transverse to the lengthwise motion for imparting outward rotation of the upper leg.

7. In apparatus of the character described, a rest for the lower portion of the body, a pair of pads for each of the upper legs, respectively arranged on the inner and the outer sides, means for cyclically moving both pads simultaneously, the paths of motion of both pads being lengthwise, and only the inner pad having a supplemental motion transverse to the lengthwise motion for imparting outward rotation of the upper leg, and a rest for the upper part of the body and movable in such manner as to accommodate the motion of the upper part of the body due to the forces exerted thereon by the pads.

8. In apparatus of the character described, a rest for the lower portion of the body, a pair of pads for each of the upper legs, respectively arranged on the inner and the outer sides, means for cyclically moving both pads simultaneously, the paths of motion of both pads being lengthwise, and only the inner pad having a supplemental motion transverse to the lengthwise motion for imparting outward rotation of the upper leg, and a pair of foot supports, movably mounted to accommodate the motion of the feet due to the flexing movement of the legs.

9. In apparatus of the character described, a rest for the lower portion of the body, a pair of pads for each of the upper legs, respectively arranged on the inner and the outer sides, means for cyclically moving both pads simultaneously, the paths of motion of both pads being lengthwise, and only the inner pad having a supplemental motion transverse to the lengthwise motion for imparting outward rotation of the upper leg, a rest for the upper part of the body and movable in such manner as to accommodate the motion of the upper part of the body due to the forces exerted thereon by the pads, and a pair of foot supports movably mounted to accommodate the motion of the feet due to the flexing movement of the legs.

10. In apparatus of the character described, a pad mechanism forming a rest for the upper part of a leg of the subject, a part of said mechanism being adapted to exert a force on the adductor leg muscle, means for cyclically moving that part of the mechanism that forms a rest for the leg in such manner as to exert a force on said muscle for rotating the femur, an abdominal pad, and means for urging the pad posteriorly of the body.

11. In apparatus of the character described, a pad mechanism forming a rest for the upper part of a leg of a subject,, a part of said mechanism adapted to exert a force on the adductor leg muscle, means for cyclically moving said mechanism so as to exert a force on said muscle for rotating the femur, an abdominal pad, means for urging the pad posteriorly of the body, and a sloping rest for the upper part of the body and movable to accommodate motion of the upper part of the body due to the forces exerted by the pads.

12. In apparatus of the character described, a pad mechanism forming a rest for the upper part of a leg of a subject, a part of said mechanism being adapted to exert a force on the adductor leg muscle, means for cyclically moving said mechanism so as to exert a force on said muscle for rotating the femur, an abdominal pad, means for urging the pad posteriorly of the body, a sloping rest for the upper part of the body and movable to accommodate motion of the upper part of the body due to the forces exerted by the pads, means adapted to clamp the neck on opposite sides thereof for restraining movement of the head about the points of engagement, and a movable support for the head.

13. In apparatus of the character described, a rest for the lower portions of a body of a subject, and a mechanism, including pads adapted to engage the inner and outer sides of the leg of the body, and to cause a rotary motion of the femur and simultaneous flexing of the leg, comprising an inner and an outer pad, a common reciprocable support for said pads, and an inclined guide means cooperating with the inner pad for raising said pad with respect to the rest.

14. The combination as set forth in claim 13, with the addition of universal adjusting means for the inner pad, as well as means whereby both pads have limited freedom of angular motion.

15. In apparatus of the character described, a rest for the lower portions of a body of a subject, and a mechanism, including pads adapted to engage the inner and outer sides of the leg of the body, and to cause a rotary motion of the femur and simultaneous flexing of the leg, comprising an inner and an outer pad, a common reciprocable support for said pads, an inclined guide means cooperating with the inner pad for raising said pad with respect to the rest, and a foot support mounted so that it accommodates motion of the foot.

16. In apparatus of the character described, a rest for the lower portion of the body, a sloping rest for the upper portion of the body, means for cyclically flexing the pelvic regions of the body, and means for mounting said sloping rest to accommodate the resultant motion of the upper part of the body, comprising a roller adapted to roll on a surface in response to the forces urging said rest in a direction upwardly or downwardly of the slope.

17. In apparatus of the character described, a rest for the lower portion of the body, a sloping rest for the upper portion of the body, means for cyclically flexing the pelvic regions of the body, and means for mounting said sloping rest to accommodate the resultant motion of the upper part of the body, comprising a pivotal mounting for the sloping rest, and below said sloping rest, and a roller guide between the sloping rest and the first mentioned rest.

18. In apparatus of the character described, a rest for the lower portion of the body, a sloping rest for the upper portion of the body, means for cyclically flexing the pelvic regions of the body, an abdominal pressure pad, and means for mounting said pad, comprising a rod pivoted above the rest on an axis transverse to the rest and extending downwardly toward the rest, and resilient means supported by the rod for urging the abdominal pad downwardly.

19. In apparatus of the character described, a rest for the lower portion of the body, a sloping rest for the upper portion of the body, means for cyclically flexing the pelvic regions of the body, and arm supporting means, comprising a pair of elements pivotally supported adjacent their upper edges on an axis above and transverse to the body rests, and means for angularly adjusting said elements.

HELEN G. SANDERS.